Feb. 2, 1932.  H. C. JENNISON  1,843,452

ELECTRIC CONDUCTOR

Filed May 19, 1931

INVENTOR
*H. C. Jennison.*
BY
*Bartlett Eyre Scott & Keel,*
ATTORNEYS

Patented Feb. 2, 1932

1,843,452

UNITED STATES PATENT OFFICE

HERBERT C. JENNISON, OF BRIDGEPORT, CONNECTICUT, ASSIGNOR TO THE AMERICAN BRASS COMPANY, OF WATERBURY, CONNECTICUT, A CORPORATION OF CONNECTICUT

ELECTRIC CONDUCTOR

Application filed May 19, 1931. Serial No. 538,422.

My invention relates to cables that are particularly adapted for high voltage transmission lines.

One of the objects of my invention is to produce a novel and improved flexible cable which is of strong and relatively light construction and in the use of which the corona effect is greatly reduced.

The following is a description of an embodiment of my invention, reference being had to the accompanying drawings, in which.

Figure 1:
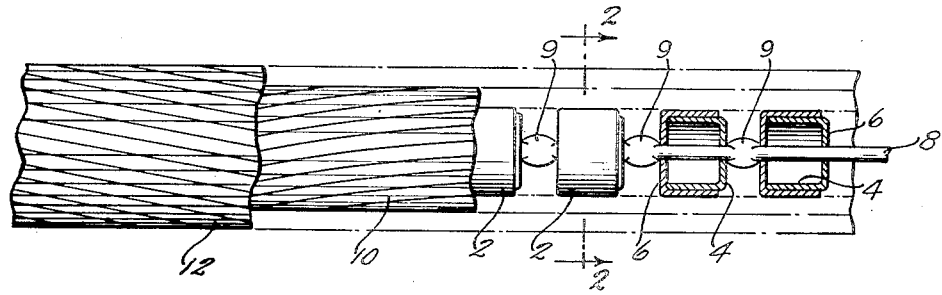
Figure 1 is a side elevation, partly in section, of one form of my improved cable.

The cable illustrated in the drawings is of the type of the one described and claimed in my pending application Serial No. 740,922, filed October 1, 1924, which has resulted in Patent No. 1,810,079, issued June 16, 1931, and of which the present application is a continuation in part.

Figure 2:
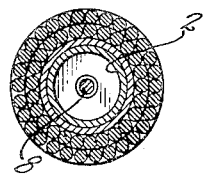
Fig. 2 is a transverse section of the cable taken on the line 2—2 of Fig. 1.

The supporting core of the cable illustrated in Figs. 1 and 2 of the drawings is made up of cylindrical devices 2 arranged end to end and spaced apart. Each of these devices comprises two cup-shaped members 4 of sheet metal which are in telescoping engagement as shown, the members being provided with flat end walls 6. The end walls of the cup-shaped members are provided with axial apertures, and the members are threaded on a flexible wire or other strand 8. In order to maintain the supporting devices in proper spaced relation on the strand 8, the strand is provided with flattened portions 9 between said devices. The cup-shaped members may be made of copper or other suitable sheet metal.

Strands or wires 10, which may be of copper or other conducting metal, may be cabled about the supporting core in the usual manner, and if desired a second layer of wires 12 may be cabled about the wires 10, the two layers usually being cabled in opposite directions.

With this construction, the vertical end walls of the cup-shaped members 4 and the double thickness of walls provided by telescoping two of the cup-shaped members together, form extremely strong and light supports for the outer covering of cabled wires. The flexible wire or strand 8 provides the necessary flexibility, and the flattened portions 9 insure the supporting devices being maintained in properly spaced relation during the cabling operation.

Figure 3:
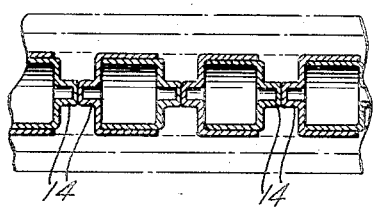
Fig. 3 is a longitudinal sectional view of a modified view.

In the form shown in Fig. 3, the end walls of the cup-shaped members are provided with axial projections 14, the adjacent projections on adjacent devices being arranged in end to end engagement. Such a construction insures proper spacing of the devices and maximum flexibility, and also is of strong and light construction.

Figure 4:
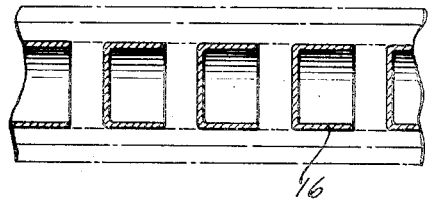
Fig. 4 is a similar view of still another form.

In the form shown in Fig. 4, single cup-shaped members 16 are arranged in end to end relation and spaced apart. This form is not only simple in construction but, for the amount of material used, is extremely strong and effectively resists crushing forces.

As will be evident to those skilled in the art, my invention permits various modifications without departing from the spirit thereof or the scope of the appended claims.

What I claim is:

1. A conducting cable comprising a spirally wound stranded conductor, and a supporting core therefor comprising a plurality of cylindrical devices arranged end to end and spaced apart, and a connecting strand for said devices extending through axial apertures therein and having enlarged portions between said devices for maintaining them in spaced relation.

2. A conducting cable comprising a spirally wound stranded conductor, and a supporting core therefor comprising a plurality of devices arranged end to end and spaced apart, each of said devices comprising two cup-shaped members arranged in telescoping engagement.

3. A conducting cable comprising a spirally wound stranded conductor, and a supporting core therefor comprising a plurality of cylindrical devices arranged end to end and spaced apart, and means for maintaining said devices in spaced relation, each of said devices comprising two cup-shaped members arranged in telescoping engagement.

4. A conducting cable comprising a spirally wound stranded conductor, and a supporting core therefor comprising a plurality of cylindrical cup-shaped members of sheet metal arranged end to end and spaced apart.

5. A conducting cable comprising a spirally wound stranded conductor, and a supporting core therefor comprising a plurality of hollow cylindrical devices of sheet metal having end walls, and a flexible connecting strand for said members extending through axial apertures in said end walls.

6. A conducting cable comprising a spirally wound stranded conductor, and a supporting core therefor comprising a plurality of cylindrical devices arranged end to end, each of said devices being made up of two cup-shaped members arranged in telescoping engagement with the end walls thereof provided with axial projections, the projections on the adjacent ends of adjacent devices being arranged in end to end engagement so as to maintain the bodies of the devices in spaced relation.

In testimony whereof, I have signed my name to this specification.

HERBERT C. JENNISON.